(12) United States Patent
Kawasumi

(10) Patent No.: US 10,015,455 B2
(45) Date of Patent: Jul. 3, 2018

(54) OPTICAL APPARATUS AND IMAGE PROJECTION APPARATUS HAVING MULTIPLE REFLECTIVE LIGHT MODULATORS AND MULTIPLE DICHROIC SURFACE THAT SEPARATE LIGHT INTO MULTIPLE COLOR LIGHTS AND COMBINES THEM

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 14/941,958

(22) Filed: Nov. 16, 2015

(65) Prior Publication Data

US 2016/0150202 A1    May 26, 2016

(30) Foreign Application Priority Data

Nov. 26, 2014  (JP) ................. 2014-238505

(51) Int. Cl.
*H04N 9/31* (2006.01)
*G02B 27/14* (2006.01)
(Continued)

(52) U.S. Cl.
CPC ......... *H04N 9/3158* (2013.01); *G02B 27/149* (2013.01); *G03B 21/208* (2013.01);
(Continued)

(58) Field of Classification Search
CPC . F21V 5/04; F21V 7/0083; F21V 9/16; G02B 26/0841; G02B 27/145;
(Continued)

(56) References Cited

U.S. PATENT DOCUMENTS 6,157,420 A * 12/2000 Nakanishi ............ H04N 9/3105
348/E9.027
6,286,961 B1 * 9/2001 Ogawa ............... G02B 27/0905
348/E5.137
(Continued)

FOREIGN PATENT DOCUMENTS

JP        10274810 A      10/1998
JP        11316356 A      11/1999
JP        2002268007 A     9/2002

*Primary Examiner* — Huyen Ngo
(74) *Attorney, Agent, or Firm* — Rossi, Kimms & McDowell LLP

(57) ABSTRACT

The optical apparatus includes multiple reflective light modulators, an illumination optical system and multiple dichroic surfaces separating a light flux from the illumination optical system into multiple color lights to introduce them to the light modulators and combining the multiple color lights reflected by the light modulators. The optical system includes a condenser lens disposed between an area in which light source images are formed and the multiple reflective light modulators. The light modulators are arranged such that their long sides are parallel to a first section, and a condition of f/D1>f/D2 is satisfied where f represents a focal length of the condenser lens, D1 and D2 represent maximum effective widths of the areas in which the light source images are formed in the first section and in a second section parallel to an optical axis and orthogonal to the first section.

12 Claims, 7 Drawing Sheets

(51) Int. Cl.
*G03B 21/20* (2006.01)
*G03B 33/12* (2006.01)
*G03B 33/04* (2006.01)

(52) U.S. Cl.
CPC ..... *G03B 21/2066* (2013.01); *G03B 21/2073* (2013.01); *G03B 33/04* (2013.01); *G03B 33/12* (2013.01); *H04N 9/3105* (2013.01); *H04N 9/3152* (2013.01)

(58) Field of Classification Search
CPC .............. G03B 21/008; G03B 21/2013; G03H 2001/221; H04N 9/3158; H04N 9/3173; A61B 3/14
See application file for complete search history.

(56) References Cited

U.S. PATENT DOCUMENTS

| | | | | |
|---|---|---|---|---|
| 6,357,878 B1* | 3/2002 | Sawamura | ........... | G02B 27/145 348/771 |
| 6,464,375 B1* | 10/2002 | Wada | ........... | G02B 9/10 362/242 |
| 2003/0147051 A1* | 8/2003 | Fujita | ........... | H04N 9/3105 353/31 |
| 2007/0153663 A1* | 7/2007 | Fukumoto | ........... | G03H 1/12 369/103 |

* cited by examiner

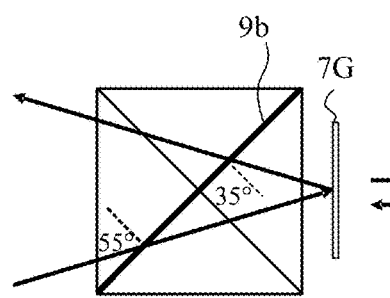
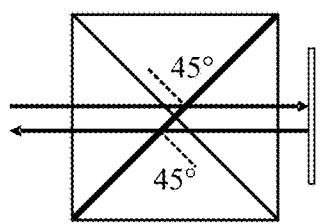
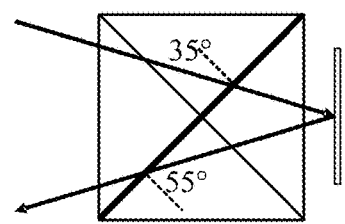
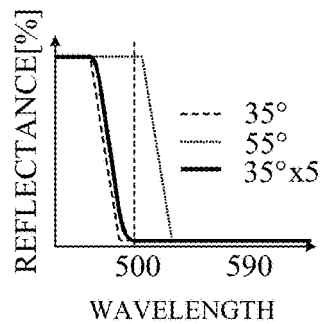
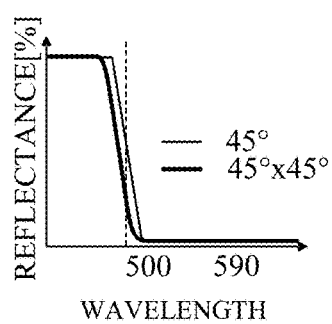
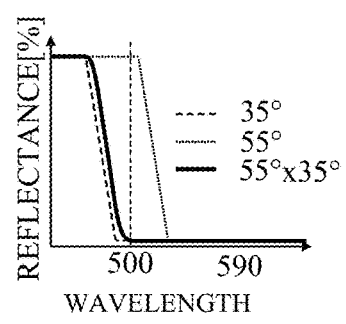
FIG. 3A  FIG. 3B  FIG. 3C

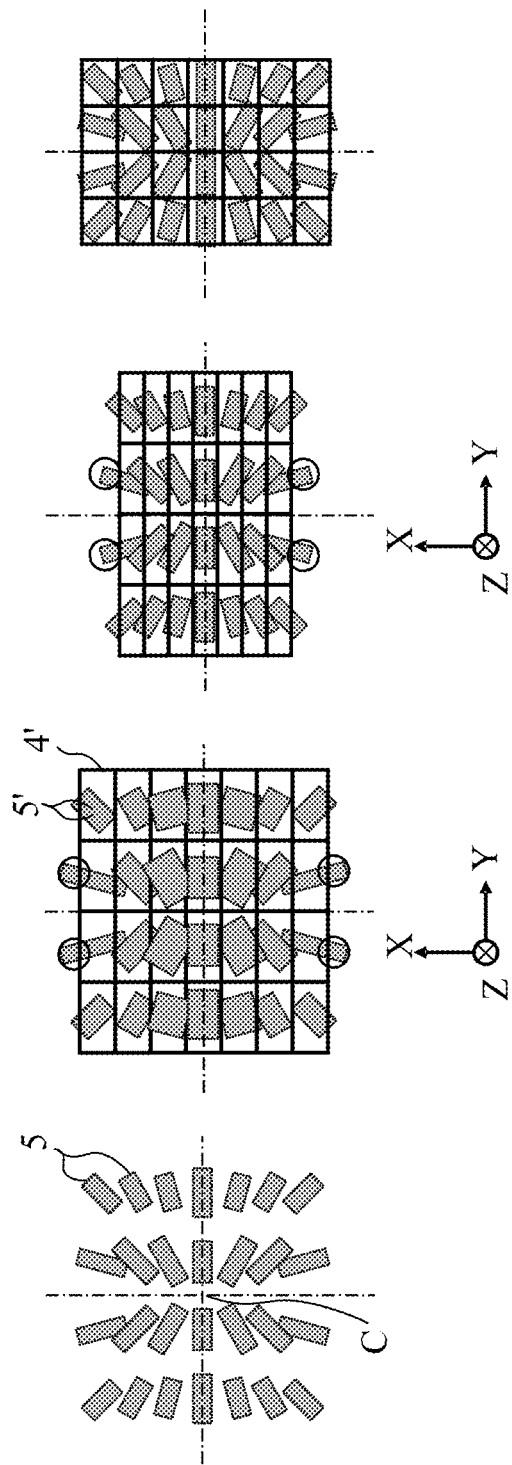

OPTICAL APPARATUS AND IMAGE PROJECTION APPARATUS HAVING MULTIPLE REFLECTIVE LIGHT MODULATORS AND MULTIPLE DICHROIC SURFACE THAT SEPARATE LIGHT INTO MULTIPLE COLOR LIGHTS AND COMBINES THEM

BACKGROUND OF THE INVENTION

Field of the Invention

The present invention relates to an optical apparatus including a reflective light modulator and an image projection apparatus using the optical apparatus.

Description of the Related Art

Image projection apparatuses (projectors) display an image by introducing a light flux emitted from a light source through an integrator optical system (illumination optical system) to a light modulator and projecting the light modulated by the light modulator depending on an input image signal through a projection optical system. Such image projection apparatuses include ones using a reflective light modulator as the light modulator, such as a reflective liquid crystal panel or a mirror light modulator.

Japanese Patent Laid-Open Nos. 10-274810 and 2002-268007 each disclose a projector that separates a white color light from the light source into three color lights, namely, an R light, a G light and a B light, introduces the three color lights to three reflective liquid crystal panels, combines the color lights from the three reflective liquid crystal panels with one another by a cross dichroic prism and then projects the combined light.

On the other hand, Japanese Patent Laid-Open No. 11-316356 discloses a projector having a similar configuration to those of the projectors disclosed in Japanese Patent Laid-Open Nos. 10-274810 and 2002-268007 while including a Philips-type dichroic prism instead of the cross dichroic prisms.

Each of the projectors disclosed in Japanese Patent Laid-Open Nos. 10-274810 and 2002-268007 causes an S-polarized light or a P-polarized light separated by a polarization beam splitter from the light from the light source to enter the cross dichroic prism to separate the polarized light into the three color lights and then combines, by the cross dichroic prism, the three color lights as P-polarized lights or S-polarized lights reflected by the reflective liquid crystal panels. As described above, the lights entering the cross dichroic prism from the polarization beam splitter and the reflective liquid crystal panels are the S- and P-polarized lights. For this reason, multiple dichroic films provided to the cross dichroic prism each need to have a sufficient dichroic characteristic for both the P-polarized light and the S-polarized light.

However, such a dichroic film typically has a characteristic that a cutoff wavelength thereof largely shifts depending on a ray incident angle. In addition, since the ray incident angle of the light from the polarization beam splitter to the dichroic film and the ray incident angle of the light from the reflective liquid crystal panel to the dichroic film are opposite to each other, a shift direction of the cutoff wavelength is inversed. Thus, a light amount loss of a spectrum component of the light from the light source around the cutoff wavelength of the dichroic film becomes large, which results in a decrease of brightness of a displayed image (projected image) and in an increase of color unevenness of the projected image.

In contrast, in the Philips-type dichroic prism used in the projector disclosed in Japanese Patent Laid-Open No. 11-316356, the ray incident angle to the dichroic film is close to 0 degree, differently from the cross dichroic prism. This results also in a decrease in a dependence on an incident angle to the dichroic film, which enables reducing the light amount loss around the cutoff wavelength further than in the projectors disclosed in Japanese Patent Laid-Open Nos. 10-274810 and 2002-268007. However, decreasing an F-number of its illumination optical system in order to further increase an amount of the light entering the reflective liquid crystal panel increases the ray incident angle to the dichroic film. This increase in the ray incident angle consequently increases the light amount loss around the cutoff wavelength, which decreases the brightness of the projected image.

On the other hand, in the projector disclosed in Japanese Patent Laid-Open No. 2002-268007, the reflective liquid crystal panels are arranged such that their short sides (short-side directions) extend parallel to a section including an optical axis of its illumination optical system and including a normal to the dichroic film of the cross dichroic prism. This arrangement aims to reduce the color unevenness by decreasing the ray incident angle to the dichroic film. However, since this projector has a configuration in which light rays enter the reflective liquid crystal panel non-telecentrically, each light ray reaches the dichroic film at an incident angle larger than a maximum incident angle defined by an F-number of the illumination optical system. This results in an undesired increase in the light amount loss around the cutoff wavelength.

Japanese Patent Laid-Open No. 2002-268007 discloses a configuration that, for the above-described purpose, reduces number of lens cells of each of first and second fly-eye lenses included in the illumination optical system in a film surface direction of the dichroic film and that compresses a width of a light flux by using a compression optical system such as a cylindrical lens in that direction (compression direction). However, since the compression of the light flux undesirably decreases a degree of parallelism of the light flux, sizes of light source images formed near the lens cells of the second fly-eye lens increase in the compression direction, which increases an amount of a light component protruding outside (not entering) apertures of the lens cells. Consequently, the projector disclosed in Japanese Patent Laid-Open No. 2002-268007 in which the short-side direction of each reflective liquid crystal panel and a direction in which the size of the light source images increases coincide with each other has an increased light amount loss, which further decreases the brightness of the projected image.

As described above, the conventional projectors using the dichroic prism that separates the light toward the multiple reflective light modulators and combines the separated lights therefrom can achieve a sufficient color unevenness reduction, but cannot prevent or insufficiently reduces the decrease in the brightness of the projected image.

SUMMARY OF THE INVENTION

The present invention provides an optical apparatus capable of providing a bright light from each of multiple reflective light modulators by reducing a light amount loss at each of multiple dichroic surfaces that perform color separation and color combination with respect to the reflective light modulators. The present invention further provides an image projection apparatus capable of providing a brighter projected image.

The present invention provides as an aspect thereof an optical apparatus including multiple reflective light modulators, an illumination optical system configured to illuminate the multiple reflective light modulators with a light flux from a light source, and multiple dichroic surfaces configured to separate the light flux from the illumination optical system into multiple color lights, introduce the multiple color lights to the multiple reflective light modulators and combine the multiple color lights reflected by the multiple reflective light modulators. The illumination optical system includes a condenser lens disposed between an area in which light source images are formed and the multiple reflective light modulators, and light modulation surfaces of the multiple reflective light modulators each have a long side and a short side. When a section parallel to an optical axis of the illumination optical system, to normals to the multiple dichroic surfaces and to normals to the light modulation surfaces of the multiple reflective light modulators is defined as a first section, and a section parallel to the optical axis and orthogonal to the first section is defined as a second section, the multiple reflective light modulators are arranged such that their long sides are parallel to the first section, and the following condition is satisfied:

$$f/D1 > f/D2$$

where f represents a focal length of the condenser lens, D1 represents a maximum effective width of the area in which the light source images are formed in the first section, and D2 represents a maximum effective width of the area in which the light source images are formed in the second section.

The present invention provides as another aspect thereof an image projection apparatus including the above optical apparatus, and a body to house the optical apparatus. The image projection apparatus is configured to project, through a projection optical system, a projection light from the optical apparatus to display a projected image.

Further features and aspects of the present invention will become apparent from the following description of exemplary embodiments with reference to the attached drawings.

BRIEF DESCRIPTION OF THE DRAWINGS

FIGS. 3A to 3C illustrate a relation between a ray incident angle to the dichroic films and a light amount.

FIGS. 4A to 4D illustrate a relation between secondary light source images and an aperture shape of each of lens cells of a fly-eye lens in Embodiment 1.

DESCRIPTION OF THE EMBODIMENTS

Exemplary embodiments of the present invention will be described below with reference to the attached drawings.

Embodiment 1

Figure 1:
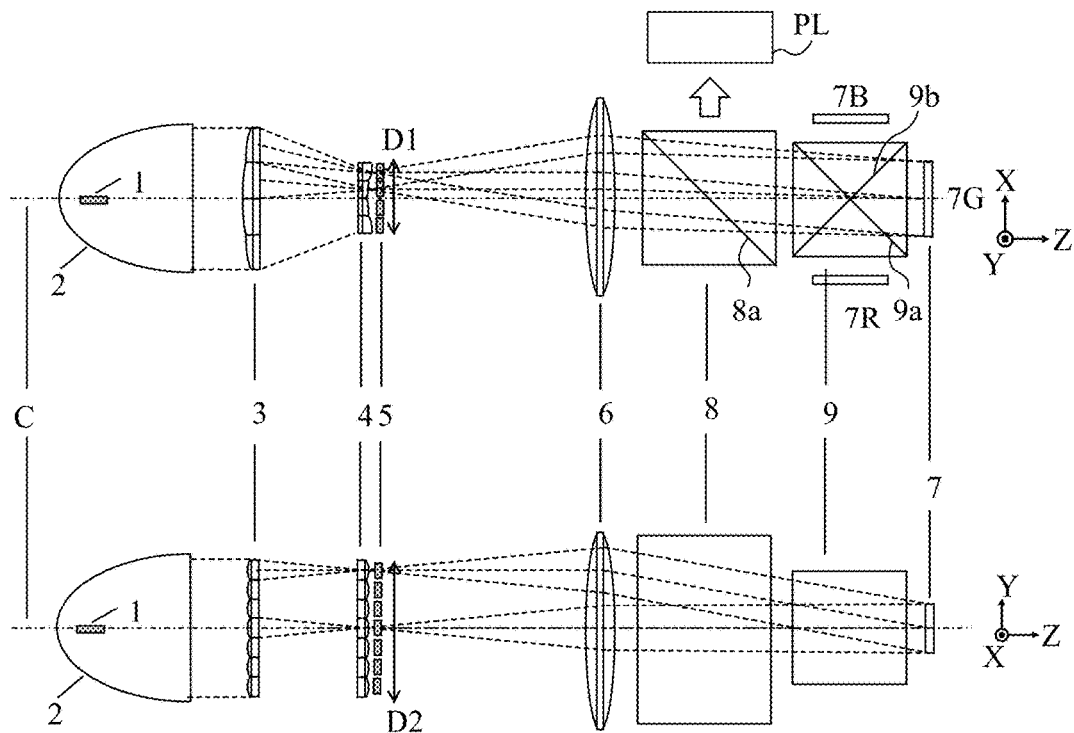
FIG. 1 is a sectional view (X-Z and Y-Z section views) illustrating a configuration of a projector optical unit that is Embodiment 1 of the present invention.

FIG. 1 illustrates a configuration of a projector optical unit (optical apparatus) that is a first embodiment (Embodiment 1) of the present invention. The projector optical unit is incorporated, as an optical engine, in a projector (image projection apparatus) together with a light source 1 and a projection optical system PL. The projection optical system PL may be part of the optical unit or may be detachably (interchangeably) attached to the optical unit.

A light flux emitted from the light source 1 is condensed by a paraboloidal reflector 2 and then enters a first fly-eye lens 3 as a collimated light flux. As the light source 1, a super-high-pressure mercury lamp or a xenon lamp is used. Alternatively, an LED may be used as the light source 1. Furthermore, a laser diode as an excitation light source that emits a blue light or the like and a phosphor performing wavelength conversion on part of the light from the excitation light source and not performing the wavelength conversion on the remaining part thereof may be used in combination with each other as the light source 1.

The light flux entering the first fly-eye lens 3 from the paraboloidal reflector 2 enters multiple lens cells of the first fly-eye lens 3 to be divided into multiple light fluxes. The multiple light fluxes enter multiple lens cells of a second fly-eye lens 4 provided correspondingly to the multiple lens cells of the first fly-eye lens 3 and are then condensed near the second fly-eye lens 4 to form multiple secondary light source images 5. The multiple light fluxes exiting the second fly-eye lens 4 are condensed by a condenser lens 6 and then overlap one another on panel surfaces (modulation surfaces) of multiple (three in this embodiment) reflective liquid crystal panels 7R, 7G and 7B through a polarization beam splitter 8 and a cross dichroic prism 9 both described later. Consequently, the panel surfaces of the reflective liquid crystal panels are uniformly illuminated.

The light flux exits the condenser lens 6 and then enters the polarization beam splitter 8. Of the light flux, only a P-polarized component transmitted through a polarization splitting surface 8a of the polarization beam splitter 8 enters the cross dichroic prism 9. The light (P-polarized light) entering the cross dichroic prism 9 is separated, by multiple (two) dichroic surfaces 9a and 9b provided inside the cross dichroic prism 9, into three color lights, namely, a red (R) light, a green (G) light and a blue (B) light. The dichroic surfaces 9a and 9b are arranged so as to mutually intersect inside the cross dichroic prism 9. The three color lights enter the reflective liquid crystal panels 7R, 7G and 7B corresponding to the respective color lights.

The reflective liquid crystal panels as reflective light modulators are capable of changing (that is, modulating) a polarization direction of a polarized light entering each of pixels thereof in response to control of orientations of liquid crystals in the pixel depending on an input image signal input to the projector. The three color lights modulated and reflected by the three reflective liquid crystal panels 7R, 7G and 7B are combined by the dichroic surface 9a of the cross dichroic prism 9. In this light combination, the P-polarized component is reflected toward the light source 1, and an S-polarized component exits the cross dichroic prism 9 toward the polarization beam splitter 8 as an image light. The image light entering the polarization beam splitter 8 is reflected by the polarization splitting surface 8a, enters the projection optical system PL and is then projected from the projection optical system PL onto a projection surface (not illustrated) such as a screen. Consequently, an RGB full-color image as a projected image is displayed.

When all of the three color lights that are the P-polarized lights respectively entering the reflective liquid crystal panels 7R, 7G and 7B are reflected by the reflective liquid crystal panels without being modulated into the S-polarized light, a black image is displayed. On the other hand, when all of the three color lights are each modulated into the S-polarized light, a white image is displayed.

The first fly-eye lens 3, the second fly-eye lens 4 and the condenser lens 6 constitute an illumination optical system as an integrator optical system that divides and condenses the light flux. An optical axis of the condenser lens 6 is hereinafter referred to as "an optical axis C" of the illumination optical system. In FIG. 1, an optical axis direction that is a direction in which the optical axis C of the illumination optical system extends is defined as a Z direction, and two directions orthogonal to the optical axis C and orthogonal to each other are defined as an X direction and a Y direction. An upper part of FIG. 1 illustrates an X-Z section (first section) parallel to the optical axis C of the illumination optical system, to normals to the dichroic surfaces 9a and 9b and to normals to the panel surfaces of the reflective liquid crystal panels 7R, 7G and 7B. On the other hand, a lower part of FIG. 1 illustrates a Y-Z section (second section) parallel to the optical axis C and orthogonal to the X-Z section.

Figure 2A:
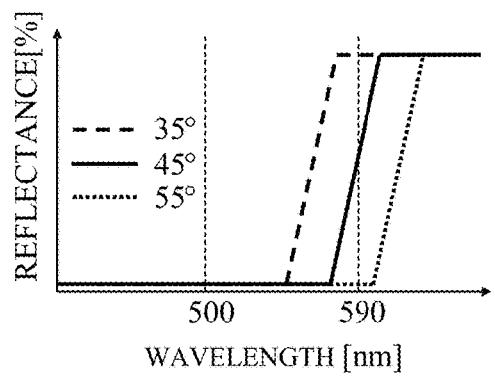
FIGS. 2A and 2B illustrate characteristics of dichroic films used in Embodiment 1.
Figure 2B:
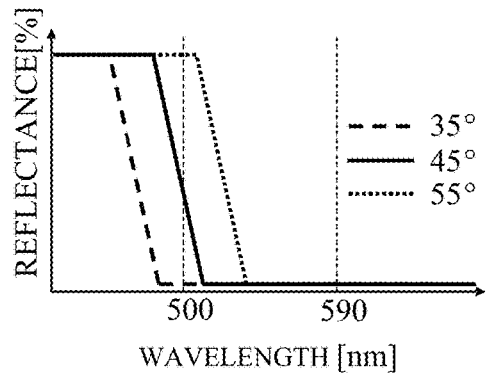

FIGS. 2A and 2B illustrate characteristics of the two dichroic films (9a and 9b) included in the cross dichroic prism 9. The two dichroic films are an R reflective film (9a) and a B reflective film (9b) respectively forming an angle of 45 degrees with respect to the optical axis C and mutually intersecting so as to form an angle of 90 degrees therebetween. The R reflective film has a cutoff wavelength of approximately 590 nm and has a characteristic that reflects a light component whose wavelength is longer than the cutoff wavelength (that is, the R light) and transmits a light component whose wavelength is shorter than the cutoff wavelength. The B reflective film has a cutoff wavelength of approximately 500 nm and has a characteristic that transmits a light component whose wavelength is longer than the cutoff wavelength and reflects a light component whose wavelength is shorter than the cutoff wavelength (that is, the B light). The light component transmitted through the R and B reflective films corresponds to the G light.

Each of the two dichroic films has an additional characteristic that its cutoff wavelength shifts toward a longer-wavelength side when a ray incident angle to its film surface is larger than 45 degrees and shifts toward a shorter-wavelength side when the ray incident angle thereto is smaller than 45 degrees.

With reference to FIGS. 3A to 3C, description will be made of influences on brightness due to the shift of the cutoff wavelength of the dichroic films depending on the ray incident angle. As illustrated in FIG. 3A, the light reaching the dichroic film 9b at an incident angle of 55 degrees toward the reflective liquid crystal panel 7G is reflected by the reflective liquid crystal panel 7G and then reaches the dichroic film 9b at an incident angle of 35 degrees. Similarly, as illustrated in FIG. 3C, the light reaching the dichroic film 9b at an incident angle of 35 degrees toward the reflective liquid crystal panel 7G is reflected by the reflective liquid crystal panel 7G and then reaches the dichroic film 9b at an incident angle of 55 degrees.

On the other hand, as illustrated in FIG. 3B, the light reaching the dichroic film 9b at an incident angle of 45 degrees toward the reflective liquid crystal panel 7G is reflected by the reflective liquid crystal panel 7G and then reaches the dichroic film 9b at an incident angle of 45 degrees.

A total characteristic (i.e., a reflectance) of the dichroic film 9b is provided by multiplying a characteristic of the dichroic film 9b for the light reaching the dichroic film 9b toward the reflective liquid crystal panel 7G by a characteristic of the dichroic film 9b for the light reflected by the reflective liquid crystal panel 7G and then reaching the dichroic film 9b. This applies also to the dichroic film 9a.

A comparison among FIGS. 3A to 3C shows that, when the incident angle of the light to the dichroic film 9b is 35 or 55 degrees, a light amount loss around the cutoff wavelength is larger than that caused when the incident angle of the light is 45 degrees. Finally, taking into consideration a ray spread angle dependent on an F-number of the illumination optical system with reference to the incident angle of 45 degrees enables calculating a total light amount loss. It is thus apparent that reducing a total ray incident angle to the dichroic films 9a and 9b enables reducing light amount losses at the dichroic films 9a and 9b.

The "F-number" referred to in this embodiment includes an F-number on the X-Z section and an F-number on the Y-Z section. The F-numbers on the X-Z and Y-Z sections are values respectively acquired by dividing a focal length f of the condenser lens 6 by a maximum effective width D (D1 and D2) of a luminance distribution of the secondary light source images 5 formed near the second fly-eye lens 4 inside the illumination optical system on the X-Z and Y-Z sections. These F-numbers on the X-Z and Y-Z sections are expressed as follows.

$$F\text{-number on the }X\text{-}Z\text{ section: }F=f/D1 \tag{1}$$

$$F\text{-number on the }Y\text{-}Z\text{ section: }F=f/D2 \tag{2}$$

Figure 10:
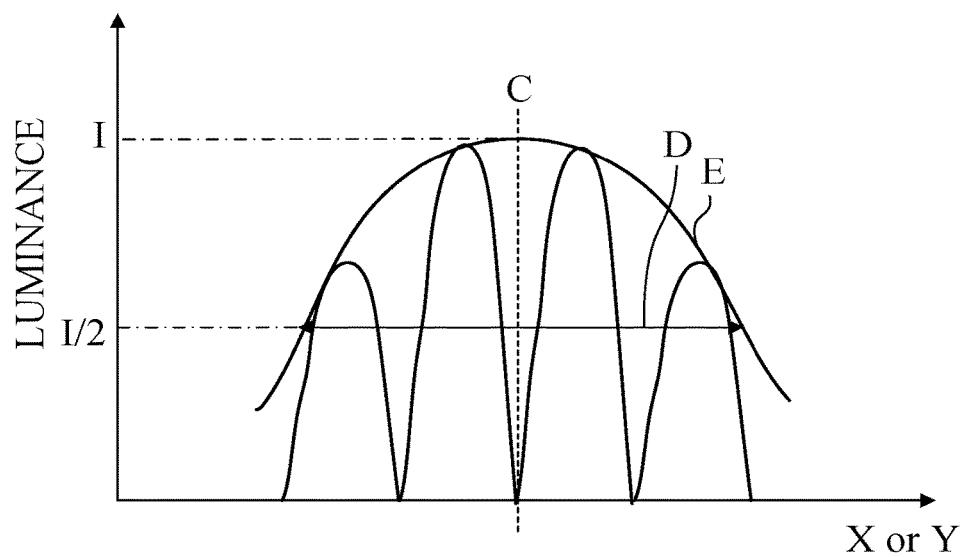
FIG. 10 is a diagram illustrating a definition of an F-number.

As illustrated in FIG. 10, the maximum effective width (maximum effective diameter) D of the luminance distribution of the secondary light source images refers to a half-value width of an envelope E of a luminance section of the secondary light source images, that is, a full width at half maximum that is a width providing a half of a maximum luminance I.

When, on each of the X-Z and Y-Z sections, e represents an angle formed by an outermost light ray of the light flux proceeding toward the dichroic film and the reflective liquid crystal panel with respect to the optical axis C, each of the F-numbers can be expressed also as:

$$F=1/(2\tan\theta). \tag{3}$$

That is, as the angle θ decreases, the F-number increases.

In the configuration of the projector disclosed in Japanese Patent Laid-Open No. 2002-268007, since the light rays from the non-telecentric illumination optical system reach the dichroic film, an angle formed by a principal ray reaching the reflective liquid crystal panel with respect to the normal to the panel surface increases with increase in a height position on the panel surface. When φ represents the angle formed by the principal ray and the normal of the panel surface, a difference in the ray incident angles between when the principal ray reaches the dichroic film toward the reflective liquid crystal panel and when the principal ray reaches the dichroic film after being reflected by the reflective liquid crystal panel is larger by $2\varphi$ than an incident angle difference $2\theta$ corresponding to the F-number. This is thus undesirable in terms of the reduction in the light amount loss at the dichroic film.

In this embodiment, the illumination optical system is configured as an optical system telecentric on a reflective liquid crystal panel side (that is, a reflective light modulator side) by setting a distance from the second fly-eye lens 4 to the condenser lens 6 in the optical axis direction to approximately identically to the focal length of the condenser lens 6. This illumination optical system enables causing the light flux in a telecentric state to reach the dichroic films and the reflective liquid crystal panels in a telecentric state. The expression "the light flux in the telecentric state" means that a light flux whose principal rays reaching respective height positions on the reflective liquid crystal panel are parallel to one another. The expression "the principal rays are parallel to one another" means that an angle formed by each of the principal rays reaching the respective height positions on the reflective liquid crystal panel with respect to the normal to the panel surface of the reflective liquid crystal panel is within a range of ±5°.

Light rays in the telecentric state described above reach the dichroic film with an angle of approximately $2\theta$ that is a maximum incident angle difference corresponding to the F-number. Therefore, the illumination optical system in this embodiment enables avoiding an increase in amount of the light ray reaching the dichroic film at an undesired incident angle and thereby enables reducing the light amount loss at the dichroic film. In addition, the illumination optical system in this embodiment makes a distribution of the ray incident angles to the reflective liquid crystal panel approximately identical at all height positions, which enables reducing color unevenness.

In this embodiment, as each of the first and second fly-eye lenses 3 and 4, an eccentric fly-eye lens is used whose each eccentric lens cell is eccentric on the X-Z section illustrated in FIG. 1 in a direction to be closer to or farther from the optical axis C with respect to a center of that eccentric lens cell. More specifically, on the X-Z section, the first fly-eye lens 3 is an eccentric fly-eye lens having a positive refractive power as a whole, and the second fly-eye lens 4 is an eccentric fly-eye lens having a negative refractive power as a whole. These first and second fly-eye lenses 3 and 4 compress a width of the collimated light flux from the reflector 2. This compression makes the maximum effective width D1 on the X-Z section shorter than the maximum effective width D2 on the Y-Z section in the luminance distribution of the secondary light source images 5. Therefore, as expressed by expression (1), the F-number on the X-Z section is larger than the F-number on the Y-Z section, that is, the ray incident angle to the dichroic film on the X-Z section is smaller than the ray incident angle thereto on the Y-Z section. In other words, the illumination optical system in this embodiment satisfies a condition of f/D1>f/D2. The satisfaction of this condition enables reducing the shift of the cutoff wavelength of the dichroic film, which enables reducing the light amount loss and the color unevenness.

On the other hand, increasing the F-number of the illumination optical system decreases a light utilization efficiency. However, in this embodiment, long sides of the panel surface of the reflective liquid crystal panel is parallel to the X-Z section, which suppresses a decrease in the light utilization efficiency caused by the increase in the F-number on the X-Z section. Description will hereinafter be made of a reason therefor.

As illustrated in FIG. 1, in the illumination optical system as the integrator optical system, the light flux is divided by the multiple lens cells of the first fly-eye lens 3 into the multiple light fluxes to form, near the second fly-eye lens 4, the multiple secondary light source images 5 corresponding to the respective lens cells. Of the light flux passing through a specific lens cell of the first fly-eye lens (the specific lens cell is hereinafter referred to as "a first lens cell"), a partial light flux passing through a second lens cell of the second fly-eye lens 5 corresponding to the first lens cell reaches the panel surface. However, another partial light flux from the first lens cell passing through lens cells adjacent to the second lens cell in the second fly-eye lens 5 is introduced outside of an effective area of the panel surface, which results in the light amount loss in the illumination optical system. For this reason, it is important to cause the light flux from the first lens cells of the first fly-eye lens 4 to pass through apertures of the second lens cells of the second fly-eye lens 4 as much as possible for increasing the light utilization efficiency of the illumination optical system. The light utilization efficiency is affected by a relation between the secondary light source images 5 and a shape of apertures (aperture shape) of the lens cells of the second fly-eye lens 4.

FIGS. 4A to 4D illustrate the relation between the secondary light source images 5 and the aperture shape of the lens cells of the second fly-eye lens 4 viewed from the optical axis direction. As illustrated in FIG. 4A, each of the light source images has a rectangular shape (rod-like shape) which reflects a shape of a discharge arc in the light source and has a tilt corresponding to a position in a reflective surface of the paraboloidal reflector 2 reflecting the light flux forming that light source image 5. This is because an angle at which the reflective surface of the reflector 2 faces the discharge arc varies depending on a height from the optical axis C. For this reason, as illustrated in FIG. 4A, the multiple light source images 5 have a radial distribution whose center is located on the optical axis C of the illumination optical system.

FIG. 4B illustrates a relation between radially distributed light source images 5' and a shape of apertures (aperture shape) of lens cells of a second fly-eye lens 4' in a case of using the configuration disclosed in Japanese Patent Laid-Open No. 2002-268007. The aperture shape of the lens cells of the second fly-eye lens 4' is rectangular homothetic to that of the panel surface.

However, the configuration disclosed in Japanese Patent Laid-Open No. 2002-268007 compresses the light flux in the first section corresponding to the X-Z section in this embodiment by using a cylindrical lens. Consequently, a size of each of the secondary light source images 5' formed near the lens cells of the second fly-eye lens 4' increases in the first section that is a compression direction, which increases an amount of a light component protruding outside (that is, not entering) the aperture of each of the lens cells. In particular, a large portion (denoted by a circle in the drawing) of the secondary light source image 5' whose longitudinal direction tilts with respect to a long-side direction of the aperture of the lens cell protrudes outside the aperture of that lens cell, which significantly decreases the light utilization efficiency.

On the other hand, in the configuration disclosed in Japanese Patent Laid-Open No. 2002-268007, when the light flux is compressed without using the cylindrical lens, but by using eccentric fly-eye lenses as in this embodiment, a size of each of the secondary light source images 5 does not increase as illustrated in FIG. 4C because parallelism of the light flux is maintained. However, this compression decreases a width of the aperture of the lens cell of the second fly-eye lens 4 in its short-side direction. Consequently, the aperture shape of the lens cell becomes a rectangular shape having an aspect ratio in which its long side is extremely longer than its short side. Also in this case, the light utilization efficiency decreases. That is, although using the cylindrical lens for the compression of the light flux and using the eccentric fly-eye lenses therefor are different in that one of them increases the size of the light source image or decreases the aperture size of the lens cell, using the cylindrical lens and using the eccentric fly-eye lenses are the same in that they increases the light amount loss and decreases the light utilization efficiency. The reasons why the light amount loss is generated in the configuration disclosed in Japanese Patent Laid-Open No. 2002-268007 are because, firstly, the shape of the panel surface and the shape of the lens cell of the fly-eye lens are homothetic to each other, and secondly, the short sides of the panel surface are parallel to the first section (the X-Z section in this embodiment).

On the other hand, in this embodiment, as described above, on the X-Z section, the first fly-eye lens 3 is configured as the eccentric fly-eye lens having the refractive power as a whole, and the second fly-eye lens 4 is configured as the eccentric fly-eye lens having the refractive power as a whole. For this reason, each lens cell of the first fly-eye lens 3 has an aperture having a rectangular shape homothetic to the panel surface, whereas each lens cell of the second fly-eye lens 4 has an aperture having a square shape whose width in the long-side direction is compressed as compared to that of the panel surface as illustrated in FIG. 4D. Such an aperture shape of the lens cells of the second fly-eye lens 4 can prevent the secondary light source images 5 from largely protruding outside the apertures of these lens cells, differently from the configuration disclosed in Japanese Patent Laid-Open No. 2002-268007. Therefore, the illumination optical system in this embodiment enables reducing the light amount loss even though the F-number is increased by compressing the light flux on the X-Z section.

That is, in order to maximize the light utilization efficiency while minimizing an area of the aperture of each of the lens cells of the second fly-eye lens 4 with respect to the radially distributed secondary light source images 5 due to the use of the paraboloidal reflector 2, it is desirable to shape the aperture of each of the lens cells of the second fly-eye lens 4 into square or a shape more similar to square than the shape of the panel surface. This embodiment allows the aperture shape of each of the lens cells to have a larger margin against the compression of the light flux on the X-Z section by arranging the reflective liquid crystal panels such that the long sides of the panel surfaces are parallel to the X-Z section, which enables achieving the above-described effect.

Figure 5A:
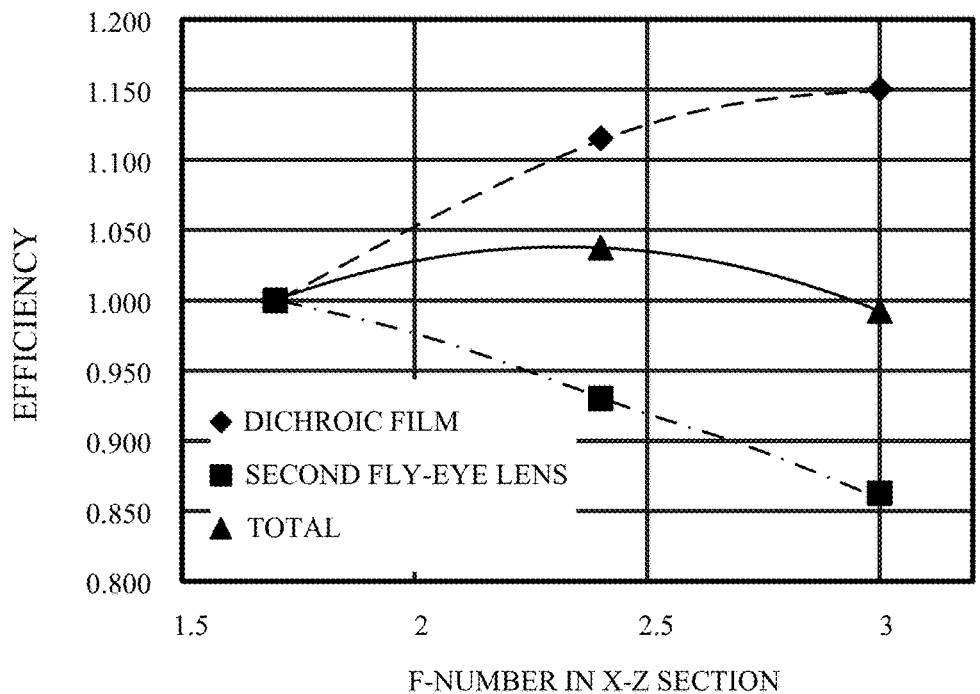
FIGS. 5A and 5B illustrate an effect of improving brightness in an optical unit of Embodiment 1.
Figure 5B:
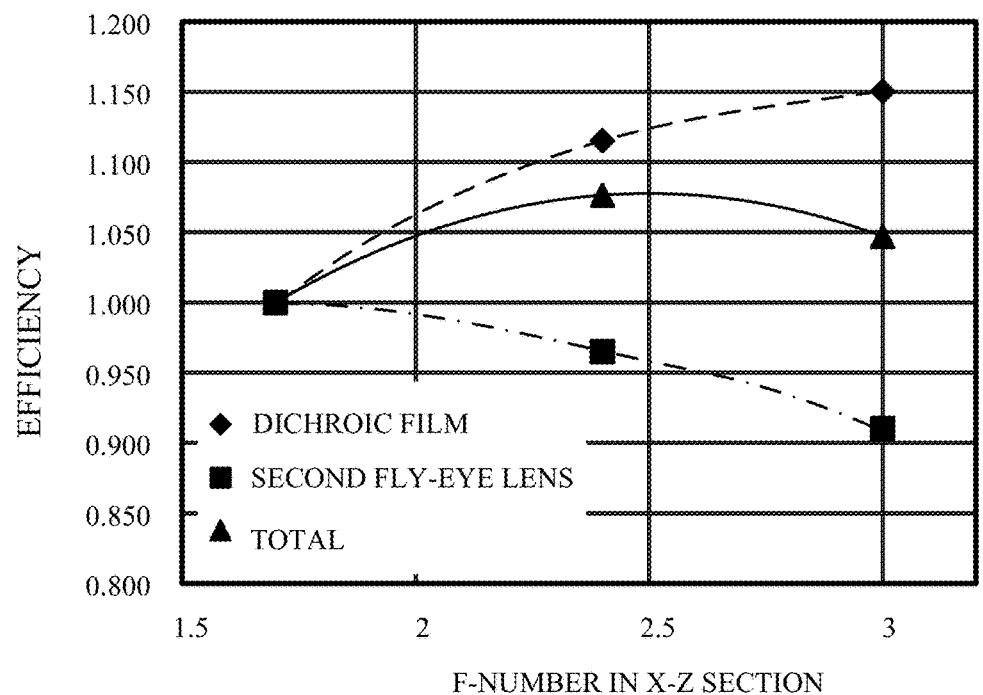

Multiplying the effect of reducing the light amount loss at the dichroic surfaces 9a and 9b by the effect of suppressing the decrease in the light utilization efficiency, which can be obtained by the F-number on the X-Z section larger than that on the Y-Z section, enables providing a final light utilization efficiency. FIGS. 5A and 5B illustrate a result of a calculation (simulation) of the multiplication. Specifically, FIG. 5A illustrates the calculation result acquired when a super-high-pressure mercury lamp whose discharge arc has a length of 1.1 mm is used as the light source 1, and FIG. 5B illustrates the calculation result acquired when a super-high-pressure mercury lamp whose discharge arc has a length of 0.9 mm is used as the light source 1. As can be understood from these drawings, increasing the F-number on the X-Z section decreases the light utilization efficiency in the second fly-eye lens 4 and, on the other hand, decreases the light amount loss at the dichroic surfaces 9a and 9b, which consequently improves the light utilization efficiency. Thus, multiplying these effects makes the final light utilization efficiency (TOTAL) higher as the F-number is increased on the X-Z section.

A degree of the decrease in the light utilization efficiency due to the increase in the F-number is smaller in the case where the discharge arc has a shorter length of 0.9 mm as illustrated in FIG. 5B than that in the case where the discharge arc has a longer length of 1.1 mm as illustrated in FIG. 5A. Thus, a larger F-number provides a higher light utilization efficiency. Therefore, reducing the incident angle to the dichroic surface makes it possible to further decrease the color unevenness and to decrease a size of the cross dichroic prism, which is advantageous in miniaturization of not only the projector optical unit, but also the projector. Consequently, when the configuration in this embodiment is employed, it is desirable to use a light source whose light emission area, such as the length of the discharge arc, is small.

As described above, this embodiment can realize a projector optical unit and a projector each capable of presenting a projected image having a higher brightness and less color unevenness as compared to the conventional configurations.

Embodiment 2

Figure 6:
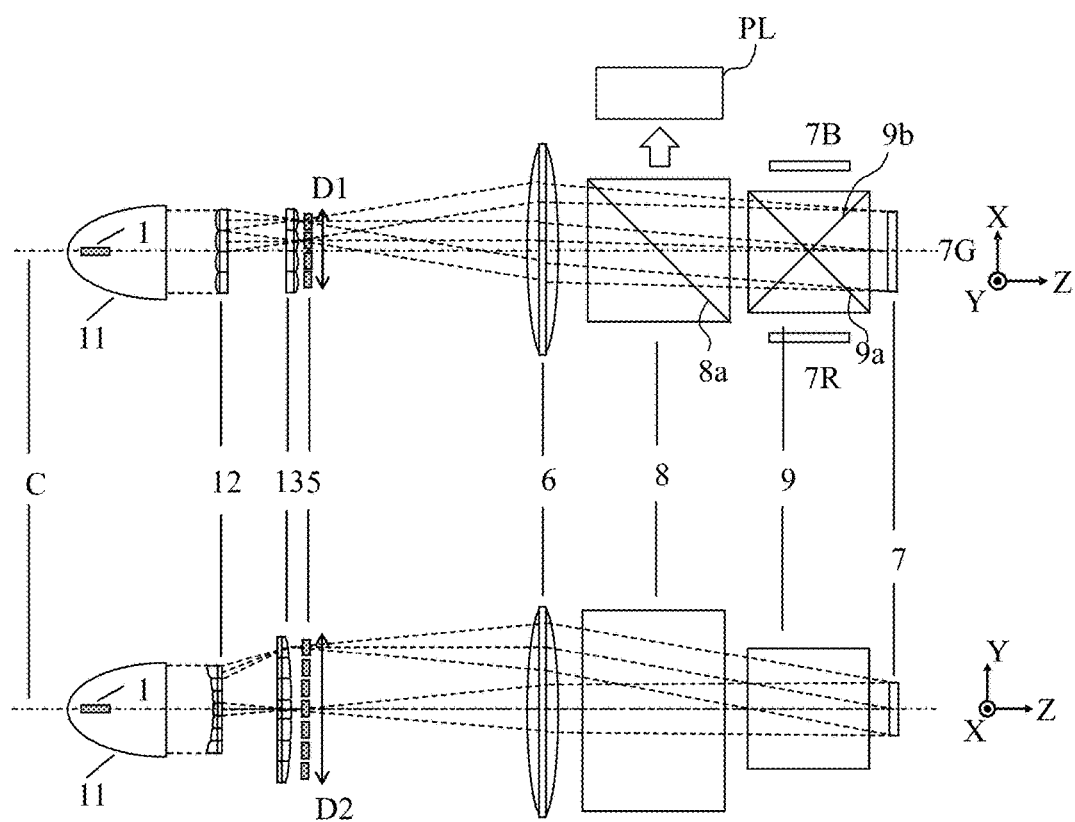
FIG. 6 is a sectional view (X-Z and Y-Z section views) illustrating a configuration of a projector optical unit that is Embodiment 2 of the present invention.

FIG. 6 illustrates a configuration of a projector optical unit of a second embodiment (Embodiment 2) of the present invention. Since this embodiment is different from Embodiment 1 only in that it uses a reflector 11 and a first fly-eye lens 12 and a second fly-eye lens 13 of the illumination optical system, other constituent elements in this embodiment common to those in Embodiment 1 are denoted by the same reference numerals or characters as those in Embodiment 1, and description thereof is omitted.

In this embodiment, on the Y-Z section as the second section, the first fly-eye lens 12 is configured as an eccentric fly-eye lens having a negative refractive power as a whole, and the second fly-eye lens 13 is configured as an eccentric fly-eye lens having a negative refractive power as a whole. This configuration enlarges a width of a collimated light flux emitted from the reflector 11 so as to make a maximum effective width D2 of a luminance distribution of secondary light source images on the Y-Z section larger than a maximum effective width D1 thereof on the X-Z section as the first section. Therefore, as in Embodiment 1, the F-number on the X-Z section is larger than the F-number on the Y-Z section. That is, this embodiment improves a total light utilization efficiency by making the F-number on the Y-Z section smaller than the F-number on the X-Z section while preventing an increase in the light amount loss at the dichroic films (9a and 9b) without changing a ray incident angle to the dichroic films on the X-Z section.

Embodiment 1 suppresses the decrease in the light utilization efficiency by forming the aperture shape of each lens cell of the second fly-eye lens 4 into a square shape by contracting the aperture shape in its long-side direction. In contrast, this embodiment improves the light utilization efficiency by forming the aperture shape of each lens cell of the second fly-eye lens 4 into a square shape by elongating the aperture shape in its short-side direction. If the aperture shape of the lens cell is elongated in the long-side direction, the protrusion of the rod-like shaped secondary light source image at positions where the longitudinal direction of the secondary light source image is largely tilted with respect to the long-side direction of the elongated rectangular aperture of the lens cell is not reduced, and thus a degree of improvement in the light utilization efficiency is low. In contrast, the aperture shape of the lens cell is square in this embodiment, which enables efficiently reducing the protrusion of the rod-like shaped secondary light source image at the positions where the longitudinal direction of the secondary light source images is largely tilted with respect to the long-side direction of the rectangular aperture of the conventional lens cell. This reduction in the protrusion enables significantly improving the light utilization efficiency.

This embodiment decreases the F-number on the Y-Z section by increasing the maximum effective width D2 of the luminance distribution of the secondary light source images 5 on the Y-Z section. Decreasing the F-number in this manner makes it necessary to decrease an F-number of the projection optical system PL, which may cause problems such as an increase in size of the projection optical system PL and a decrease in resolution performance. In this regard, this embodiment reduces outer dimensions of the first fly-eye lens 12 by using the reflector 11 with a small aperture diameter. This consequently makes the maximum effective width of the luminance distribution of the secondary light source images 5 in this embodiment approximately the same as that in Embodiment 1, which prevents the above-described problems from occurring. Therefore, in addition to the effects achieved by Embodiment 1, this embodiment enables achieving an effect of miniaturizing the illumination optical system, by using the reflector with the small aperture diameter.

Embodiment 3

Figure 7:
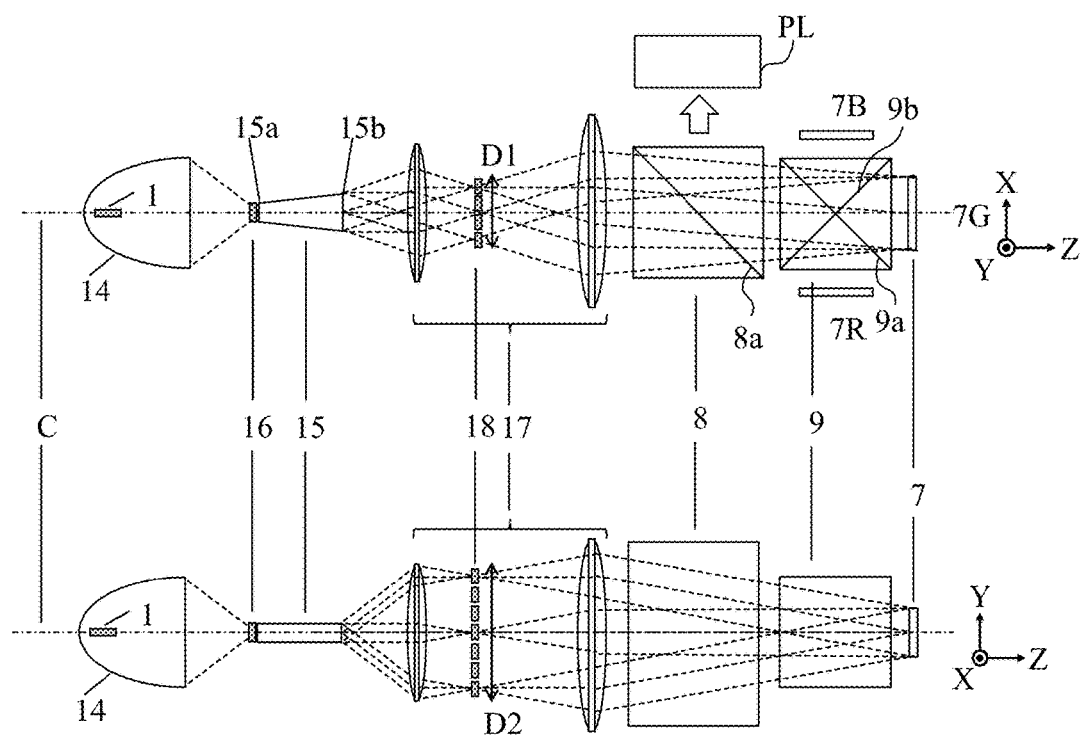
FIG. 7 is a sectional view (X-Z and Y-Z section views) illustrating a configuration of a projector optical unit that is Embodiment 3 of the present invention.

FIG. 7 illustrates a configuration of a projector optical unit that is a third embodiment (Embodiment 3) of the present invention. This embodiment is different from Embodiments 1 and 2 in that it uses a rod integrator 15 in an illumination optical system instead of the first and second fly-eye lenses. Constituent elements in this embodiment common to those in Embodiments 1 and 2 are denoted by the same reference numerals or characters as those in Embodiments 1 and 2, and description thereof is omitted The rod integrator 15 is an optical element formed of glass and having a rectangular-shaped section orthogonal to the optical axis C. Light entering the rod integrator 15 from its entrance surface 15a is repeatedly internally totally reflected thereinside to form a uniform luminance distribution at its exit surface 15b. The rod integrator 15 is the same as the first and second fly-eye lenses in Embodiment 1 and 2 in that it is provided to uniformly illuminate the panel surfaces of the reflective liquid crystal panels 7R, 7G and 7B. The exit surface 15b of the rod integrator 15 corresponds to the first fly-eye lens, and the entrance surface 15a thereof corresponds to the second fly-eye lens. The rod integrator 15 has a tapered shape in which a size of its section orthogonal to the optical axis C varies (increases) from the entrance surface 15a toward the exit surface 15b.

As the rod integrator 15, a hollow rod integrator may alternatively be used which is provided with, on its side surfaces, a reflective mirror formed by vapor deposition of a multi-layer dielectric film or a metal film.

A light flux emitted from the light source 1 is condensed by an elliptical reflector 14 to form a secondary light source image 16 near the entrance surface 15a of the rod integrator 15 and then enters the rod integrator 15. The exit surface 15b of the rod integrator 15 has a rectangular shape homothetic to the shape of the panel surface of each reflective liquid crystal panel. The light flux exiting the exit surface 15b of the rod integrator 15 is condensed by a relay lens system 17 on the panel surface of each reflective liquid crystal panel. It is the same as Embodiments 1 and 2 in that the light flux passes through the polarization beam splitter 8 and is then color-separated by the cross dichroic prism 9. Also in this embodiment, as in Embodiment 1, each reflective liquid crystal panel is arranged such that the long sides of the panel surface are parallel to the X-Z section as the first section. Accordingly, long sides of the exit surface 15b of the rod integrator 15 are also parallel to the X-Z section.

A light source image (hereinafter referred to as "a tertiary light source image") 18 is formed also at an intermediate position in the relay lens system 17. The tertiary light source image 18 corresponds to the secondary light source image formed near the second fly-eye lens in the illumination optical system in each of Embodiments 1 and 2 using the first and second fly-eye lenses. F-numbers on the X-Z and Y-Z sections referred to in this embodiment are values acquired by dividing a focal length f of a lens included in the relay lens system 17 at a position closest to the liquid crystal panel and serving as a condenser lens by maximum effective widths D1 and D2 of a luminance distribution of the tertiary light source image 18 on the X-Z and Y-Z sections (see expressions (1) and (2)). Thus, as the maximum effective width of the luminance distribution of the tertiary light source image 18 increases, the F-number decreases, which means that the ray incident angle to the reflective liquid crystal panel becomes larger.

However, when the relay lens system 17 includes multiple lenses each serving as the condenser lens, the F-number is acquired by using not the focal length of only the lens closest to the liquid crystal panel, but a total focal length of the multiple lenses.

The lens serving as the condenser lens refers to a lens unit that is located between the liquid crystal panel and the light source image formed closest to the liquid crystal panel and is constituted by one or more lenses condensing the light source image formed closest to the liquid crystal panel on the panel surface.

As described above, this embodiment uses the taper-shaped rod integrator 15. Two of four side surfaces other than the entrance and exit surfaces 15a and 15b of the rod integrator 15 which face each other in the X-Z section are formed so as to become closer to each other from the exit surface 15b toward the entrance surface 15a. This shape causes the entrance surface 15a of the rod integrator 15 to have a square shape.

After light rays entering the rod integrator 15 are reflected by the side surfaces having the above-described taper (hereinafter referred to as "tapered surface"), an angle formed by each of the light rays with respect to the optical axis C becomes smaller than that before the reflection. Thus, repetition of the reflection on the tapered surface allows the light rays finally exiting the exit surface 15b to have a smaller spread angle on the X-Z section. This reduction in the spread angle allows the tertiary light source image 18 on the X-Z section to have a smaller maximum effective width D1 of the luminance distribution on the X-Z section, which allows the F-number on the X-Z section to have a larger value than that of the F-number on the Y-Z section. This enables decreasing the ray incident angle to the dichroic film (9a and 9b), which enables reducing the light amount loss at the dichroic film.

Figure 8A:
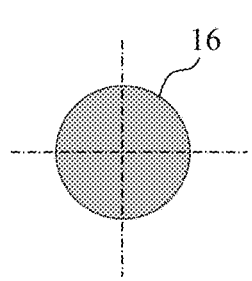
FIGS. 8A to 8C illustrate relations between a secondary light source image and shapes of an entrance surface of a rod integrator in Embodiment 3.
Figure 8B:
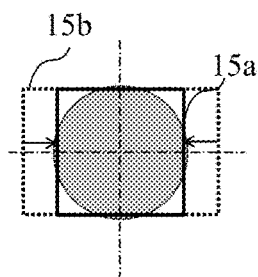
Figure 8C:
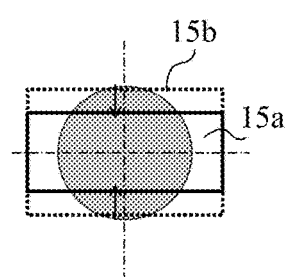

FIGS. 8A to 8C illustrate a relation between the secondary light source image 16 and an aperture shape of the entrance surface 15a of the rod integrator 15. The secondary light source image 16 is formed near the entrance surface 15a of the rod integrator 15 by the elliptical reflector 14 facing the discharge arc of the light source 1 from all 360-degree directions. For this reason, the secondary light source image 16 has an approximately circular shape (symmetric to its center) as illustrated in FIG. 8A.

In general, when the entrance surface of the rod integrator has a small area, vignetting is generated in a light source image formed near the entrance surface, which decreases the light utilization efficiency. However, in this embodiment, although the entrance surface 15a of the rod integrator 15 is formed so as to have an area smaller than that of the exit surface 15b, the entrance surface 15a has a square shape by being narrowed along a long-side direction of the exit surface 15b as illustrated in FIG. 8B. This prevents generation of a large vignetting of the light source image, which prevents the light utilization efficiency from significantly decreasing. That is, similarly to the aperture shape of the lens cell of the second fly-eye lens described in Embodiment 1, it is advantageous from a light utilization efficiency point of view that the entrance surface 15a of the rod integrator 15 has the square shape.

Conversely, as illustrated in FIG. 8C, when the rod integrator 15 is formed such that its entrance surface 15a' has a tapered shape that becomes narrower along a short-side direction of the exit surface 15b, the entrance surface 15a' has a rectangular shape with an aspect ratio in which its long side is extremely longer than its short side. Such a rectangular shape has a low match ratio to the circular secondary light source image 16, which results in a light utilization efficiency significantly lower than that in the case of using a square shape with the identical area. The reason why such a difference occurs is because the long side of the panel surface of the reflective liquid crystal panel is arranged in parallel to the X-Z section as in Embodiments 1 and 2.

As described above, this embodiment reduces the light amount loss at the dichroic film by setting the F-number on the X-Z section to be larger than the F-number on the Y-Z section while making the long side of the panel surface of the reflective liquid crystal panel parallel to the X-Z section. This forms the rod integrator 15 having the tapered shape on the X-Z section, which reduces the generation of the vignetting of the secondary light source image 16 on the entrance surface 15a even though the entrance surface 15a has a reduced area and thus prevents the decrease in the light utilization efficiency.

Although this embodiment forms the rod integrator 15 having the tapered shape in which its two side surfaces facing each other on the X-Z section become closer to each other toward the entrance surface 15a, it may be formed so as to have a tapered shape in which two side surfaces facing each other on the Y-Z section become farther from each other toward the entrance surface to allow the entrance surface of the rod integrator to have a square shape. In this case, although the F-number on the X-Z section remains the same and the F-number on the Y-Z section becomes smaller as in Embodiments 1 and 2, the ray incident angle to the rod integrator can be decreased by using the elliptical reflector 14 having a longer focal length than that of the reflector used in this embodiment. This allows the luminance distribution of the tertiary light source image to have a maximum effective width similar to that in this embodiment, which enables making the entire F-number the same as that in Embodiment 1.

Embodiment 4

Figure 9:
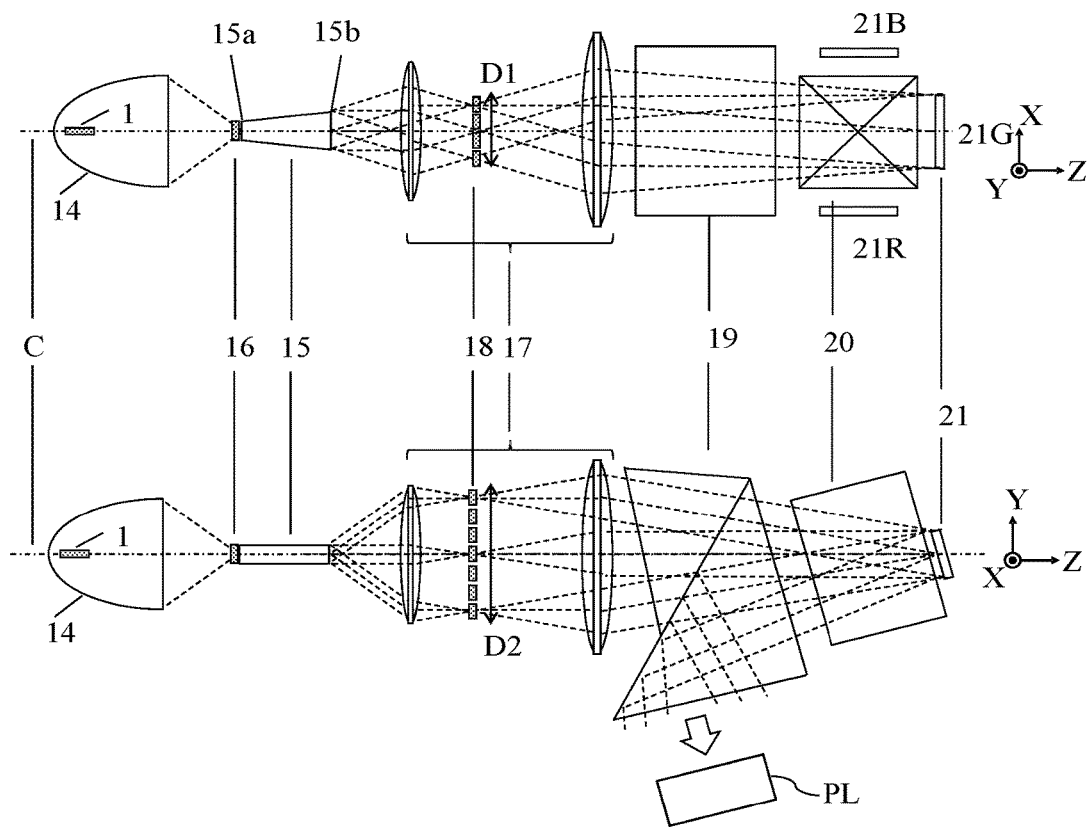
FIG. 9 is a sectional view (X-Z and Y-Z section views) illustrating a configuration of a projector optical unit that is Embodiment 4 of the present invention.

FIG. 9 illustrates a configuration of a projector optical unit that is a fourth embodiment (Embodiment 4) of the present invention. An upper part of FIG. 9 illustrates a sectional view of an illumination optical system on an X-Z section including an optical axis of the illumination optical system (such as an optical axis of a condenser lens in the illumination optical system) and being parallel to an X direction and a Z direction. A lower part of FIG. 9 illustrates a sectional view of the illumination optical system on a Y-Z section including the optical axis of the illumination optical system and being orthogonal to the X-Z section. A configuration of this embodiment is different from that of Embodiment 3 in that it uses mirror light modulators 21 as reflective light modulators instead of the reflective liquid crystal panels and in that an internal total reflective prism 19 instead of the polarization beam splitter. In FIG. 9, for ease of understanding, the internal total reflective prism 19, a cross dichroic prism 20 and mirror light modulators 21 are simply illustrated (illustrated not as a correct X-Z section view, but as a view of a section inclined to the X-Z section).

The mirror light modulator includes, on its surface as a light modulation surface, multiple micromirrors each corresponding to each of pixels arranged in a matrix. An orientation of each micromirror is switched between two tilt positions, namely, an ON position and an OFF position by application of a voltage to a driver of the micromirror. Light reaching the micromirror being at the ON position is reflected by the micromirror and then introduced to a projection optical system, whereas light reaching the micromirror being at the OFF position is not introduced to the projection optical system.

Since the mirror light modulator that modulates the light as described above is independent of polarization states of the reaching light and the reflected light, dichroic films in the cross dichroic prism 20 are each required to have a film characteristic corresponding to a non-polarized light. This requirement results in the same problem as that occurring in the configuration using the reflective liquid crystal panel. Since, in this case, an entrance optical path and a reflection optical path are different from each other, the internal total reflective prism 19 is used as an optical path switching element instead of the polarization beam splitter.

This embodiment reduces the light amount loss by using the taper-shaped rod integrator as in Embodiment 3 for increasing the F-number on the X-Z section to decrease the ray incident angle to the dichroic film. In addition, this embodiment suppresses a decrease in the light utilization efficiency caused by the increase in the F-number by making a long-side direction of the mirror light modulator correspond to the X-Z section.

The switching of the entrance optical path of light rays to the mirror light modulator and the reflection optical path thereof from the mirror light modulator increases an angle formed by light rays. For this reason, arranging an optical path switching surface of the internal total reflective prism 19 on the Y-Z section as illustrated in FIG. 9 enables preventing the ray incident angle to the dichroic film from increasing, which is desirable in terms of the light utilization efficiency. This enables realizing an image projection apparatus capable of projecting a bright image even when the apparatus uses the mirror light modulator.

Although Embodiments 1 to 4 use the cross dichroic prism (9 or 20), other dichroic prisms such as a Philips-type dichroic prism may alternatively be used as disclosed in Japanese Patent Laid-Open No. 2002-268007. The Philips-type dichroic prism described here refers to a prism (color separation/combination prism) in which color separation/combination surfaces such as an R reflective film and a B reflective film do not intersect with each other and is applicable to each of Embodiments 1 to 4 described above.

Furthermore, although Embodiments 1 and 2 respectively use the paraboloidal reflectors 2 and 11 as a reflector, a combination of an elliptic reflector and a concave lens may alternatively be used. Similarly, although Embodiment 3 uses the elliptical reflector 14, a combination of a paraboloidal reflector and a convex lens may alternatively be used.

In each of Embodiments 1 to 3, a polarization conversion element array may be provided at a position at which the secondary light source image 5 or the tertiary light source image 18 is formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-238505, filed on Nov. 26, 2014, which is hereby incorporated by reference wherein in its entirety.

What is claimed is:

1. An optical apparatus comprising:
multiple reflective light modulators each having a light modulation surface that is rectangular;
an illumination optical system configured to illuminate the multiple reflective light modulators with a light flux from a light source;
a first optical element having a first dichroic surface and a second dichroic surface configured to separate the light flux from the illumination optical system into multiple color lights, introduce the multiple color lights to the multiple reflective light modulators, and combine the multiple color lights reflected by the multiple reflective light modulators; and
a second optical element configured to guide the multiple color lights combined by the first dichroic surface and the second dichroic surface to a projection optical system,
wherein the illumination optical system includes:
at least one third optical element configured to uniformly illuminate the light modulation surface with light from the light source; and
a condenser lens disposed between an area where a light source image is formed, other than at an incident surface of the at least one third optical element and the multiple reflective light modulators,
wherein a long side direction of the light modulation surface is parallel to a first plane and a short side direction of the light modulation surface is parallel to a second plane,
wherein the first plane is parallel to a normal of the first dichroic surface and a normal of the second dichroic surface,
wherein the second plane is orthogonal to the first plane and parallel to an optical axis of the illumination optical system, and
wherein the following condition is satisfied:

$f/D1 > f/D2$, where f represents a focal length of the condenser lens, D1 represents a maximum effective width of the area where the light source images are formed in the first plane, and D2 represents a maximum effective width of the area where the light source images are formed in the second plane.

2. The optical apparatus according to claim 1, wherein the maximum effective width of the area where the light source image is formed in the first and second planes is a full width at half maximum.

3. The optical apparatus according to claim 1, wherein the illumination optical system is telecentric on a side of the multiple reflective light modulators.

4. The optical apparatus according to claim 1, wherein the first and second dichroic surfaces are arranged to mutually intersect with each other.

5. The optical apparatus according to claim 1, wherein the first and second dichroic surfaces are arranged to not mutually intersect with each other.

6. The optical apparatus according to claim 1, wherein:
the at least one third optical element comprises a first fly-eye lens including multiple lens cells and a second fly-eye lens including multiple lens cells corresponding to the multiple lens cells of the first fly-eye lens, and
each of the first and second fly-eye lenses is an eccentric fly-eye lens whose each eccentric lens cell is eccentric in a direction to be closer to or farther from the optical axis with respect to a center of that eccentric lens cell.

7. The optical apparatus according to claim 1, wherein the at least one third optical element comprises a rod integrator having a shape where a size of a plane orthogonal to the optical axis varies from an entrance surface to an exit surface.

8. The optical apparatus according to claim 1, wherein the multiple reflective light modulators are reflective liquid crystal panels.

9. The optical apparatus according to claim 1, wherein the multiple reflective light modulators are mirror light modulators including multiple mirrors whose orientations are variable.

10. The optical apparatus according to claim 1, wherein the at least one third optical element comprises multiple fly-eye lenses or a rod integrator.

11. The optical apparatus according to claim 1, wherein the second optical element comprises a polarization beam splitter or an internal total reflective prism.

12. An image projection apparatus comprising:
a light source; and
an optical apparatus configured to project light from the light source, through a projection optical system, to display a projected image,
wherein the optical apparatus comprises:
multiple reflective light modulators each having a light modulating surface that is rectangular;
an illumination optical system configured to illuminate the multiple reflective light modulators with a light flux from the light source;
a first optical element having a first dichroic surface and a second dichroic surface configured to separate the light flux from the illumination optical system into multiple color lights, introduce the multiple color lights to the multiple reflective light modulators, and combine the multiple color lights reflected by the multiple reflective light modulators; and
a second optical element configured to guide the multiple color lights combined by the first dichroic surface and the second dichroic surface to the projection optical system,
wherein the illumination optical system includes:
at least one third optical element configured to uniformly illuminate the light modulation surface with light from the light source; and a condenser lens disposed between an area where a light source image is formed, other than at an incident surface of the at least one third optical element and the multiple reflective light modulators, wherein a long side direction of the light modulation surface is parallel to a first plane and a short side direction of the light modulation surface is parallel to a second plane, wherein the first plane is parallel to a normal of the first dichroic surface and a normal of the second dichroic surface, wherein the second plane is orthogonal to the first plane and parallel to an optical axis of the illumination optical system, and wherein the following condition is satisfied:

$f/D1 > f/D2$, where f represents a focal length of the condenser lens, D1 represents a maximum effective width of the area where the light source images are formed in the first plane, and D2 represents a maximum effective width of the area where the light source images are formed in the second plane.

\* \* \* \* \*